United States Patent [19]

Tsuchihashi

[11] Patent Number: 4,588,041
[45] Date of Patent: May 13, 1986

[54] VEHICLE FOR DRIVING ALONG A LEAD LINE

[75] Inventor: Toshio Tsuchihashi, Yokohama, Japan

[73] Assignee: Tokyo Shibaura Denki Kabushiki Kaisha, Kawasaki, Japan

[21] Appl. No.: 592,281

[22] Filed: Mar. 22, 1984

[30] Foreign Application Priority Data

Mar. 29, 1983 [JP] Japan .................................. 58-51450

[51] Int. Cl.$^4$ ............................................ B60K 26/00
[52] U.S. Cl. .................................................... 180/168
[58] Field of Search ...................... 180/168, 167, 169

[56] References Cited

U.S. PATENT DOCUMENTS

| | | | |
|---|---|---|---|
| 4,044,853 | 8/1977 | Melke | 180/167 |
| 4,078,630 | 3/1978 | Krieg | 180/168 |
| 4,127,182 | 11/1978 | Thole | 180/168 |
| 4,345,662 | 8/1982 | Deplante | 180/168 |

FOREIGN PATENT DOCUMENTS

| | | |
|---|---|---|
| 2810576 | 9/1979 | Fed. Rep. of Germany . |
| 20587 | 2/1980 | Japan . |
| 47508 | 4/1980 | Japan . |

*Primary Examiner*—Michael Koczo
*Attorney, Agent, or Firm*—Oblon, Fisher, Spivak, McClelland & Maier

[57] ABSTRACT

A vehicle having front and rear wheels which may be freely steered, and driving along a lead line. The vehicle has position detectors for detecting deviations of the front and rear end of the vehicle from the lead line and is driven such that the front wheels and the rear wheels are individually steered in response to outputs from the position detectors.

5 Claims, 9 Drawing Figures

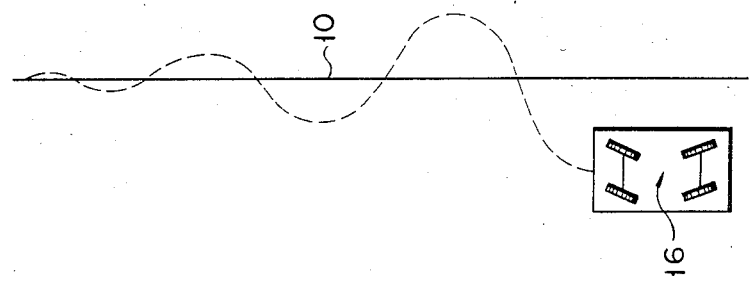
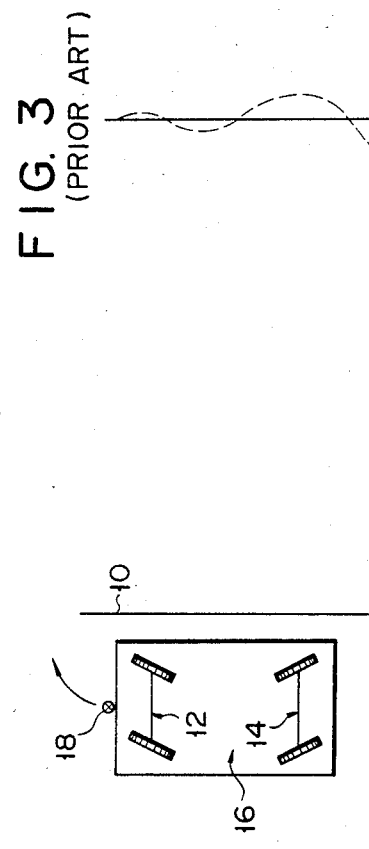
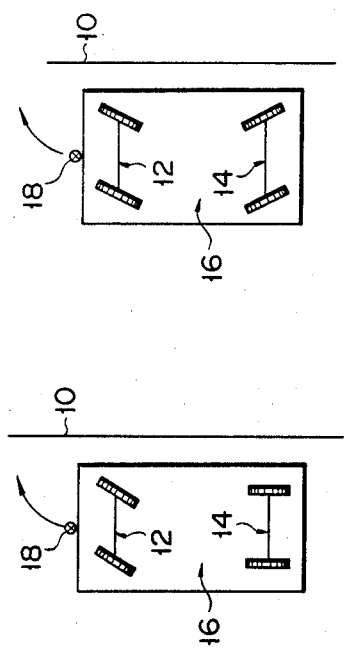
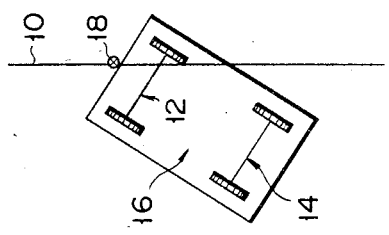
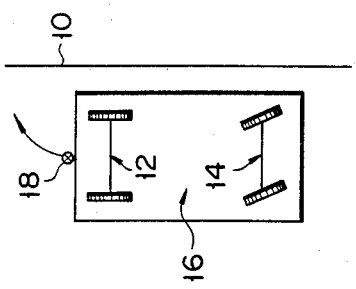

VEHICLE FOR DRIVING ALONG A LEAD LINE

BACKGROUND OF THE INVENTION

The present invention relates to a vehicle travelling along a lead line preinstalled in a floor or on the ground, and a method of steering the same.

Conventional vehicles are divided into three types: a front wheel steering type, a rear wheel steering type, and a front- and rear-wheel interlocking steering type, as shown in FIGS. 1A to 1C. While the front wheel steering type vehicle is travelling, as shown in FIG. 1A, the front wheels 12 are so controlled that the vehicle travels along the lead line 10. The rear wheels 14 are fixedly directed toward a straight forward direction parallel to the lead line. The steering direction and degree of the front wheels 12 are determined by the direction and absolute value of a positional error (deviation) detected by a detector 18 mounted at the front end of the vehicle 16. On the other hand, in the rear wheel steering type vehicle shown in FIG. 1B, the front wheels 12 are fixedly directed toward a straight forward direction, and the rear wheels 14 are steered in accordance with the output from the detector 18. In the case of the front- and rear-wheel interlocking steering type vehicle shown in FIG. 1C, the front wheels 12 are steered in the same manner as those of the front wheel steering type vehicle, and the rear wheels 14 are steered in the same manner as those of the rear wheel steering type vehicle, such that the front wheels 12 are steered at a given positive angle with respect to a straight forward direction and the rear wheels 14 are steered at an equal but negative angle with respect to the straight forward direction.

The common factor in these conventional vehicles lies in the fact that only one detector 18 is arranged to detect a deviation from the lead line 10. Therefore, a problem as shown in FIG. 2 occurs. In particular, when the detector 18 is exactly aligned on the lead line 10, further steering cannot be performed even if the vehicle 16 is not parallel to the lead line 10. Therefore, the vehicle 16 crosses the lead line 10, and travels in a zigzag manner, as shown in FIG. 3. The vehicle 16 cannot be completely aligned with the lead line 10 in a short period of time, resulting in inconvenience. This is because the angle of inclination of the vehicle 16 to the lead line is not corrected.

SUMMARY OF THE INVENTION

It is an object of the present invention to overcome the above-mentioned problems of the conventional vehicle and to provide a vehicle which can be quickly aligned with a lead line, and a method of steering the same.

In order to achieve the above object of the present invention, there is provided a vehicle comprising a main body having front and rear wheels which are independently steered, first and second position detectors which are mounted at front and rear portions of the main body to respectively detect deviations from a lead line, and a steering section for individually steering the front and rear wheels in accordance with outputs from said first and second detectors.

According to the present invention, the vehicle travels toward the lead line so as to correct the angle of inclination of the vehicle to the lead line and thus can be quickly aligned with the lead line.

BRIEF DESCRIPTION OF THE DRAWINGS

FIGS. 1A to 1C are representations of conventional vehicles;

FIG. 2 shows a state wherein the conventional vehicle is not properly aligned with a lead line;

FIG. 3 shows a track of the conventional vehicle;

FIG. 7 is a representation showing a track of the vehicle shown FIG. 4.

DETAILED DESCRIPTION OF THE PREFERRED EMBODIMENT

Figure 4:
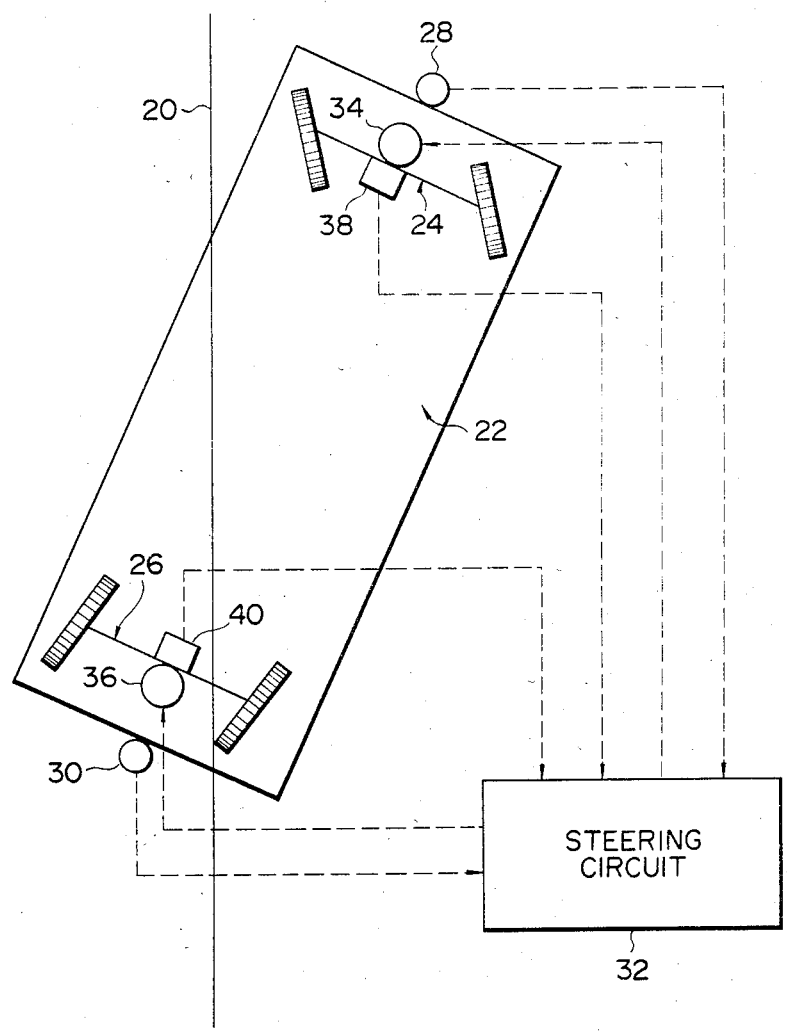
FIG. 4 is a schematic view of a vehicle according to an embodiment of the present invention.

A vehicle according to an embodiment of the present invention will be described with reference to the accompanying drawings. FIG. 4 is a schematic view of the vehicle. There are various methods of leading the vehicle. In this embodiment, an electromagnetic leading method is used, wherein a lead line 20 comprises a wire through which an AC current flows. A vehicle body 22 has front and rear wheels 24 and 26 which may be freely steered. Position detectors (comprising coils) 28 and 30 are mounted at the front and rear ends of the vehicle body 22 to respectively detect deviations of the position detectors 28 and 30 from the lead line 20 in accordance with magnetic field intensities. Outputs from the position detectors 28 and 30 are supplied to a steering circuit 32 (in the vehicle body 22). The steering circuit 32 causes front- and rear-wheel steering motors 34 and 36 to respectively rotate in accordance with the outputs from the detectors 28 and 30. In this embodiment, a front- and rear-wheel individual steering system is employed. Steering angle detectors 38 and 40 are arranged at the front and rear wheels 24 and 26 to respectively detect steering angles (directions and absolute values). Outputs from the steering angle detectors 38 and 40 are supplied to the steering circuit 32.

Figure 5:
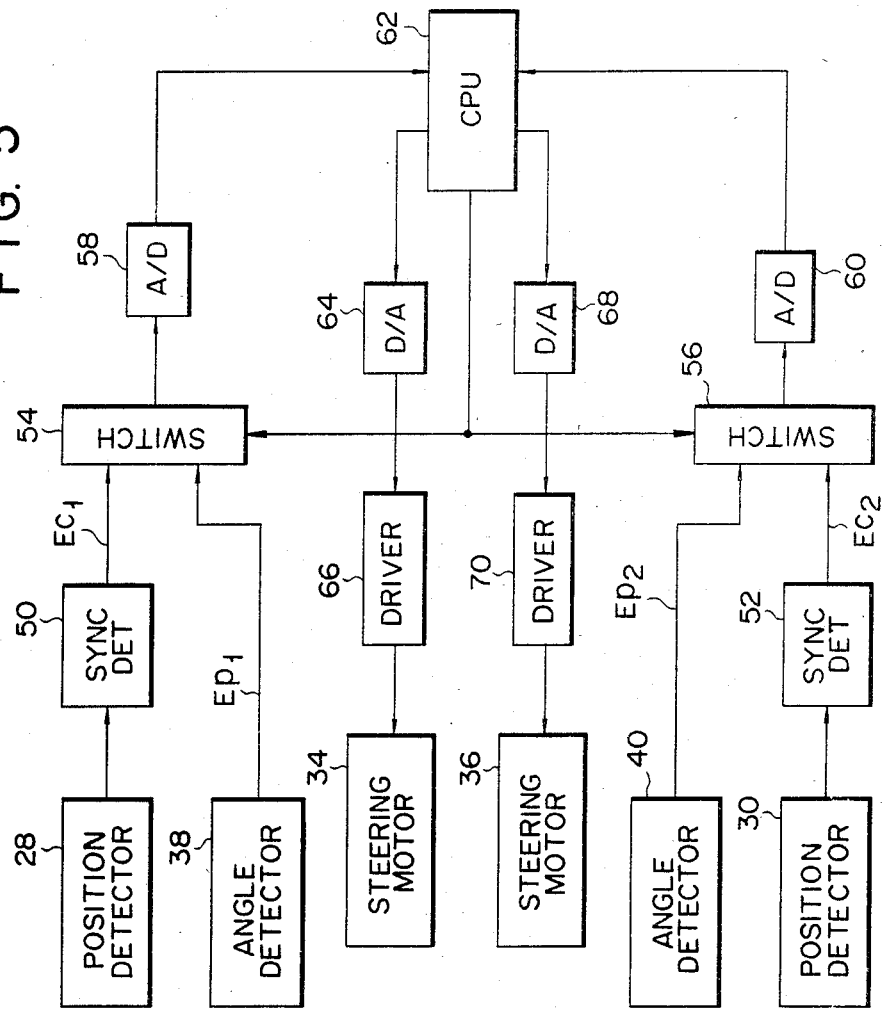
FIG. 5 is a block diagram of a steering circuit for the vehicle shown in FIG. 4.

A detailed block diagram of the steering circuit 32 is illustrated in FIG. 5. The outputs from the position detectors 28 and 30 are supplied to first input terminals of switches 54 and 56 through synchronous detectors 50 and 52, respectively. The output signals from the steering angle detectors 38 and 40 are supplied to second input terminals of the switches 54 and 56, respectively. Each of the switches 54 and 56 selects one of the inputs thereto. The output signals from the switches 54 and 56 are supplied to a CPU 62 through A/D converters 58 and 60. The switches 54 and 56 are switched under the control of the CPU 62. More specifically, when the switch 54 selects the output supplied from the steering angle detector 38, the switch 56 also selects the output supplied from the steering angle detector 40 under the control of the CPU 62. The CPU 62 supplies a front wheel steering signal to the steering motor 34 through a D/A converter 64 and a driver 66. At the same time, the CPU 62 supplies a rear wheel steering signal to the steering motor 36 through a D/A converter 68 and a driver 70.

Figure 6:
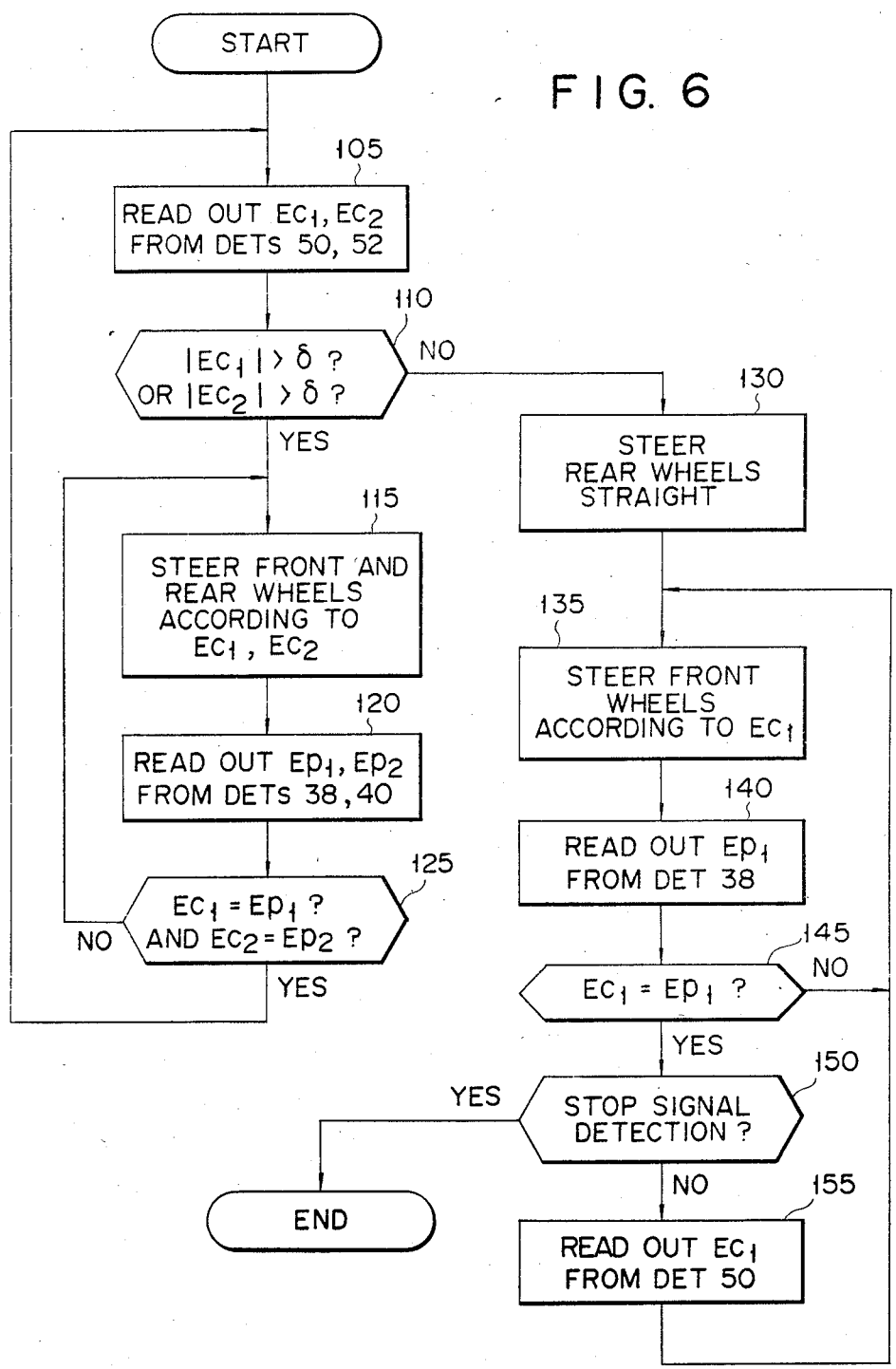
FIG. 6 is a flow chart for explaining a method of steering the vehicle shown in FIG. 4.

The operation of the vehicle will now be described with reference to a flow chart of the CPU 62 shown in FIG. 6. The embodiment has two steering modes: a first mode wherein the vehicle is some distance away from the lead line 20 and gradually travels closer to the lead line 20; and a second mode wherein the vehicle is aligned with the lead line 20 and travels along the lead line 20. In the first mode, front- and rear-wheel individual steering is performed to prevent overshooting, unlike in the case of the conventional vehicle. In the second mode, only the front wheels (or rear wheels) are steered in the same manner as in the case of the conventional vehicle.

When the vehicle is started, the CPU 62 causes the switches 54 and 56 to be set to receive at their first input terminals the signals supplied from the synchronous detectors 50 and 52, so that the CPU 62 reads out deviation signals $Ec_1$ and $Ec_2$ (from the position detectors 28 and 30) respectively indicating deviations of the detectors 28 and 30 from the lead line 20, as shown in step 105. The deviation signal is a positive voltage signal when the detector is located at the right of the lead line 20, and is a negative voltage signal when the detector is located at the left of the lead line 20. The magnitude of the voltage depends on a distance between the corresponding position detector and the lead line 20. It is checked in step 110 whether or not absolute values of the deviation signals $Ec_1$ and $Ec_2$ exceed an allowable value $\epsilon$. When at least one of the absolute values $|Ec_1|$ and $|Ec_2|$ exceeds the allowable value $\delta$, the vehicle is detected to be some distance away from the lead line 20, so that front- and rear-wheel individual steering is performed. However, when the absolute values $|Ec_1|$ and $|Ec_2|$ are both smaller than the allowable value $\epsilon$, the vehicle is detected to be aligned on the lead line 20, so that front wheel steering is performed. For this reason, when the vehicle is aligned on the lead line at the beginning of travel, front- and rear-wheel individual steering is not performed, but front wheel driving is performed. However, when the vehicle is some distance away from the lead line at the beginning of travel, front- and rear-wheel individual steering is first performed to align the vehicle on the lead line, and then front wheel steering is performed to cause the vehicle to travel along the lead line.

In the front- and rear-wheel individual steering mode, in step 115, the steering motor 34 is controlled in response to the deviation signal $Ec_1$, and the steering motor 36 is controlled in response to the deviation signal $Ec_2$. When the deviation signal is positive, the wheels are directed toward the left. Otherwise, the wheels are directed toward the right. The steering angle of the wheels depends on the absolute value of the deviation signal. In this manner, the steering angles of the front and rear wheels are independently calculated. For this reason, as shown in FIG. 7, when the vehicle 22 is at an angle to the lead line 20, the vehicle 22 travels toward the lead line while continuously correcting its angle of inclination thereto, unlike in the case of the conventional vehicle wherein the vehicle crosses the lead line while being inclined at an angle to the lead line. Therefore, overshooting does not occur, and the vehicle can be quickly aligned on the lead line 20. In step 120, the switches 54 and 56 are switched to the second input terminals, so that the CPU 62 reads out steering angle signals $Ep_1$ and $Ep_2$ respectively generated from the steering angle detectors 38 and 40. The steering angle signal is a voltage signal corresponding to the steering angle (steering degree) of the wheels. When the wheels are steered to the left, the steering angle signal is set to be positive. Otherwise, the steering angle signal is set to be negative. The relationship between the steering angle signal $Ep$ and the steering angle is determined such that when the steering angle is given to be optimum with respect to a given deviation, the steering angle signal $Ep$ becomes equal to the deviation signal $Ec$. For this reason, the CPU 62 checks in step 125 whether or not relations $Ec_1 = Ep_1$ and $Ec_2 = Ep_2$ are established. Steps 115 and 120 are repeated until these relations are established. When these relations are established, the flow returns to step 105, and new deviation signals $Ec_1$ and $Ec_2$ are read out. In this manner, the front- and rear-wheel individual steering mode continues until the absolute values $|Ec_1|$ and $|Ec_2|$ become lower than the allowable value $\delta$. Thereafter, the front wheel steering mode is performed.

In the front wheel steering mode, the steering motor 36 is controlled in step 130 such that the rear wheels are directed toward a straight forward direction. In step 135, the steering motor 34 is controlled in accordance with the deviation signal $Ec_1$. In step 140, the switch 54 is switched to the second input terminal to read out the steering angle signal $Ep_1$. The CPU 62 checks in step 145 whether or not $Ec_1 = Ep_1$ is established. Steps 135 and 140 are repeated until relation $Ec_1 = Ep_1$ is established. When $Ec_1 = Ep_1$ is established, one front-wheel steering cycle is completed. Thereafter, it is checked in step 150 whether or not a stop signal is detected. If NO, in step 155 the deviation signal $Ec_1$ is read out, and the front-wheel steering operation is repeated from step 135. When the stop signal is detected, the vehicle stops. The stop signal may be manually entered through a keyboard, an operation button, etc. Alternatively, the stop signal may be generated from a stop signal generator arranged in part of the lead line installed in the floor, and be detected by a sensor or the like.

According to this embodiment as described above, as the vehicle comes close to the lead line, deviations of the front end thereof from the lead line and of the rear end thereof from the lead line are detected. The front and rear wheels are independently steered in accordance with the detected values, respectively, so that the vehicle can be quickly aligned with the lead line. In addition, once the vehicle is aligned with the lead line, the front- and rear-wheel individual steering mode is automatically switched to the front wheel steering mode since the vehicle has destabilized in the right-and-left direction during the front- and rear-wheel individual steering mode, thereby providing stable travel.

The present invention is not limited to the particular embodiment described above. Various changes and modifications may be made within the spirit and scope of the present invention. For example, when the vehicle travels along the lead line, rear wheel steering may be performed in place of front wheel steering. In the above embodiment, feedback operation is repeated until the steering angle signal becomes equal to the deviation signal. Predetermined one-steering operation may be performed in accordance with the deviation, and the next deviation may be detected. The position detectors need not be arranged at the front and rear ends, but can be arranged in the front and rear portions.

What is claimed is:

1. A vehicle which is driven along a lead line, comprising:
   a main body having a front and rear wheels which are independently steered;
   first and second position detecting means which are mounted to front and rear portions of said main body and include means for respectively detecting deviations from the same lead line; and steering means for individually steering said front and rear wheels in accordance with outputs from said first and second position detecting means.

2. A vehicle according to claim 1, in which said lead line comprises a wire through which an AC current flows, and said first and second position detecting means comprise coils for respectively detecting a magnetic field intensity from said lead line.

3. A vehicle according to claim 1, in which said steering means include means to steer said front and rear wheels to the left when said first or second position detecting means detects a deviation thereof to a right side of said lead line, and includes means to steer said front and rear wheels to the right when said first or second position detecting means detects a deviation thereof to a left side of said lead line.

4. The vehicle of claim 3 wherein said steering means includes separate steering motors and steering angle detector means for said front and rear wheels.

5. The vehicle of claim 4 including programmed steering control circuit means operatively connected to said steering motors for controlling said steering motors and operatively connected to said position detecting means and said steering detector means for receiving position and steering angle signals therefrom.

* * * * *